Oct. 17, 1967   V. KOTĚŠOVEC ET AL   3,347,289
APPARATUS FOR RIP SAWING OF LOGS AND TIMBERS
Original Filed Aug. 4, 1965   3 Sheets-Sheet 1
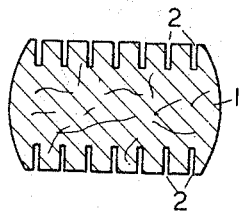
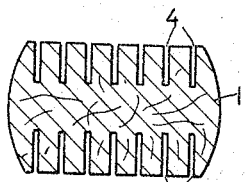
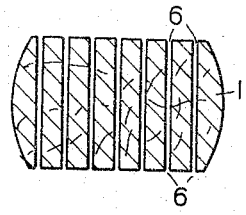
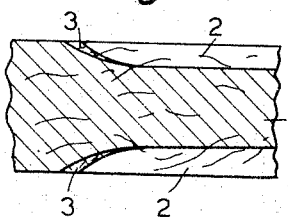
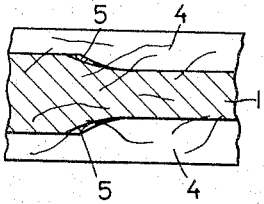
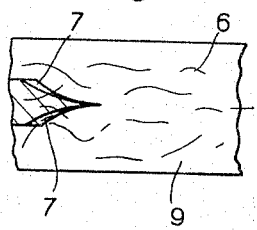
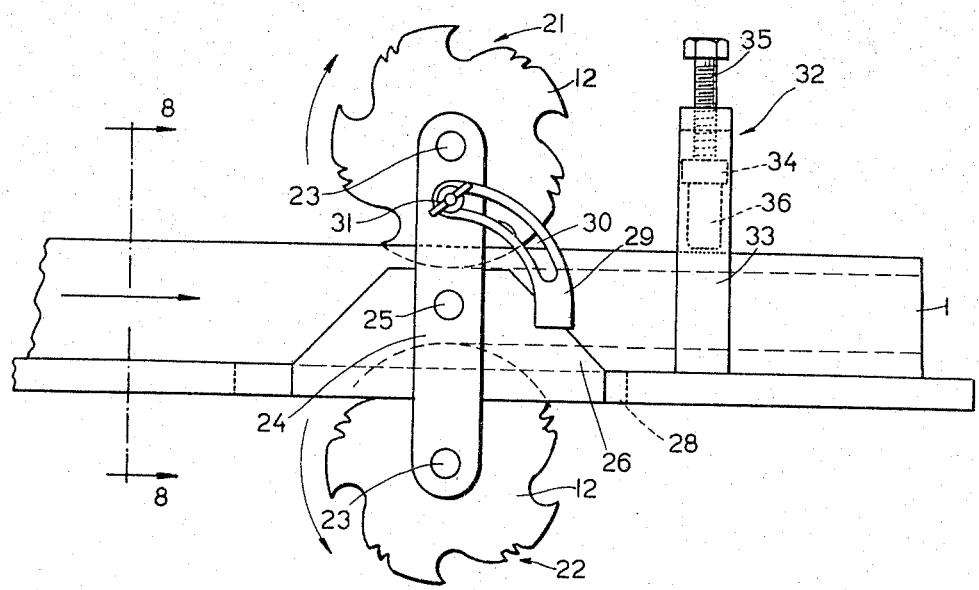
INVENTORS
Vladimír Kotěšovec, Jan
Žižka, Vlastimil Janata Oct. 17, 1967 V. KOTĚŠOVEC ETAL 3,347,289
APPARATUS FOR RIP SAWING OF LOGS AND TIMBERS
Original Filed Aug. 4, 1965 3 Sheets-Sheet 2

INVENTORS
Vladimír Kotěšovec, Jan
Žižka, Vlastimil Janata
By Richard Low
Ag't

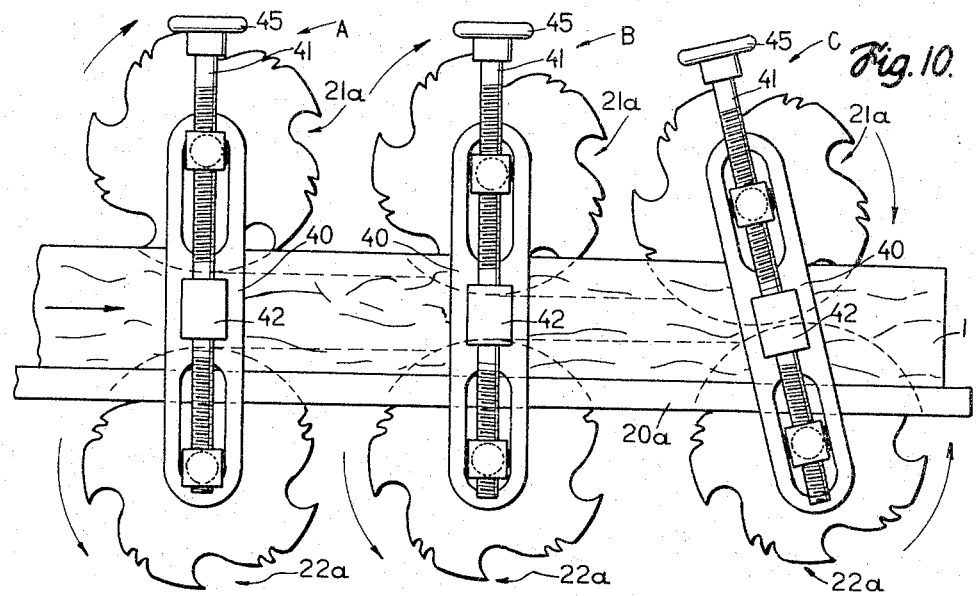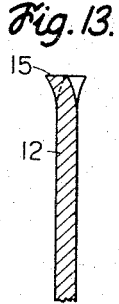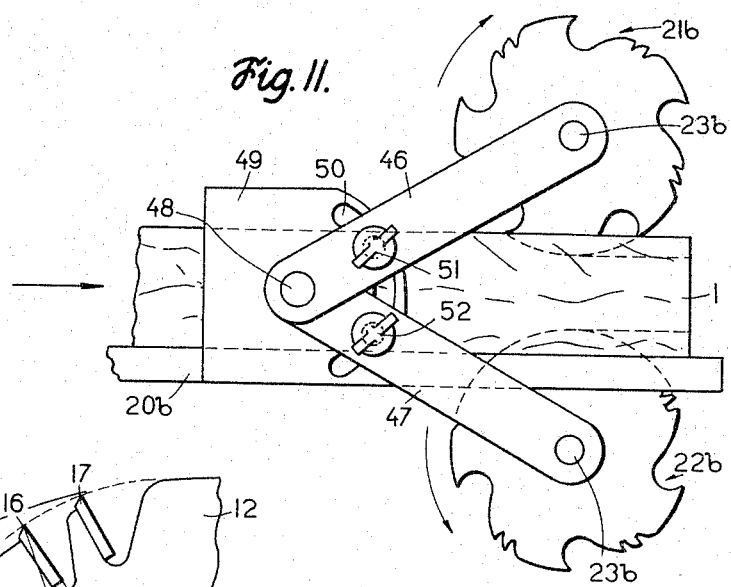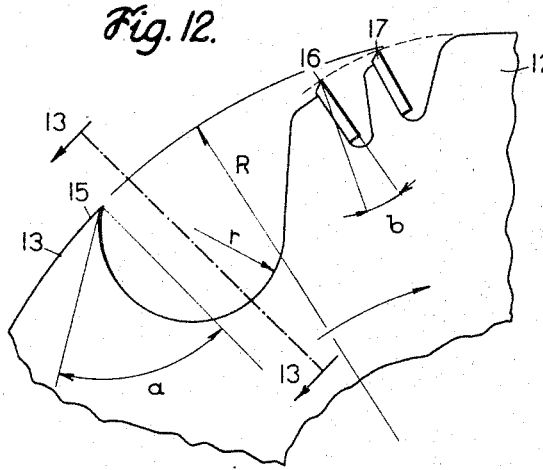

United States Patent Office 3,347,289
Patented Oct. 17, 1967

3,347,289
APPARATUS FOR RIP SAWING OF
LOGS AND TIMBERS
Vladimir Kotesovec and Jan Zizka, Prague, and Vlastimil Janata, Trutnov, Czechoslovakia, assignors to Vyzkumny a vyvojovy ustav drevardsky, Prague, Czechoslovakia
Original application Aug. 4, 1965, Ser. No. 479,046, now Patent No. 3,304,972, dated Feb. 21, 1967. Divided and this application Oct. 12, 1966, Ser. No. 604,086
Claims priority, application Czechoslovakia, Apr. 5, 1961, 712/61
8 Claims. (Cl. 143—36)

ABSTRACT OF THE DISCLOSURE

A sawing apparatus in which a log or the like is ripped by successive passes under rotary saw blades set to cut in the same kerf and having chip forming teeth circumferentially separated by rounded gullets. The teeth have a face angle of at least 40° and a concave face starting from the cutting edge and leading into the gullet. The enclosed circle defined by the gullet has a radius of $\frac{1}{5}$ to $\frac{1}{14}$ of the peripheral blade diameter. When the depth of cut during each pass is small, the blades remove from the kerfs long continuous chips suitable for use in chipboard and the like.

This application is a division of our copending application, Ser. No. 479,046, filed on Aug 4, 1965, now Patent No. 3,304,972.

This invention relates generally to the rip sawing of logs and timbers into boards, planks or like plate shaped members, and more particularly is directed to an improved apparatus for effecting such rip sawing so as to obtain elongated wood chips or shavings as a waste material which is suitable for the production of chipboard, fiberboard, cellulose and other products by known processes.

Heretofore, the rip sawing of logs, timbers and the like has always resulted in the occurrence of inferior wooden waste in the form of fine sawdust. For the most part, such fine sawdust has merely been burned as an unusable waste material which is not suitable for further mechanical or chemical processing so as to obtain useful by-products. Relatively long unitary wooden chips or lumps are required as the starting material for all mechanical or chemical processes using wooden waste materials for the production of chipboard, fiberboard, cellulose, or the like.

Accordingly, it is an object of this invention to provide various forms of sawing apparatus by which the rip sawing of logs, timbers or the like may be performed so as to obtain a wooden waste material in the form of relatively long chips.

In accordance with an important aspect of the invention, the above object is achieved by effecting the rip sawing of logs, timbers or the like with saw blades which are arranged and constructed so that each tooth of a blade is effective to continuously form a unitary chip from the time of its initial contact with the wood being cut until the disengagement of the tooth from the wood. Further, the logs, timbers or the like are cut through during a series of passes through the sawing apparatus so that the saw kerfs made during each pass are relatively shallow.

More specifically, each sawblade employed for the rip sawing of logs, timbers or the like in accordance with this invention is in the form of a disk having peripheral saw teeth, with each saw tooth having a face angle of at least 40° with respect to a radial line to the cutting edge of the tooth and a rounded gullet whose walls define an enclosed circle having a radius of between $\frac{1}{5}$ to $\frac{1}{14}$ of the diameter of the sawblade or disk. Further, sawblades embodying the invention may have guiding teeth which are interposed between the described saw teeth and do not have any cutting functions, or such guiding teeth may be employed as precutting teeth with a negative face angle of at least 20°.

The above, and other objects, features and advantages of this invention, will be apparent in the following detailed description of illustrative embodiments thereof which is to be read in connection with the accompanying drawings forming a part hereof, and wherein:

FIGS. 1, 2 and 3 are transverse sectional views illustrating the successive steps in the rip sawing of a log, timber or the like into boards or planks in accordance with the present invention;

FIGS. 4, 5 and 6 are fragmentary longitudinal sectional views illustrating the cutting of relatively long wooden chips during the successive sawing steps corresponding to FIGS. 1, 2 and 3, respectively;

FIG. 7 is a diagrammatic side elevational view illustrating a sawing apparatus embodying the present invention suitable for the rip sawing of logs, timbers or the like in the manner illustrated in FIGS. 1 to 6, inclusive;

FIG. 10 is a diagrammatic side elevational view illustrating a sawing apparatus in accordance with still another embodiment of this invention;

FIG. 11 is a diagrammatic side elevational view illustrating a sawing apparatus in accordance with yet another embodiment of this invention;

FIG. 12 is an enlarged, fragmentary side elevational view of a portion of a sawblade with sawing teeth in accordance with this invention; and FIG. 13 is a fragmentary sectional view taken along the line 13—13 on FIG. 12 and illustrating the set of the saw teeth on the sawblade.

Figure 8:
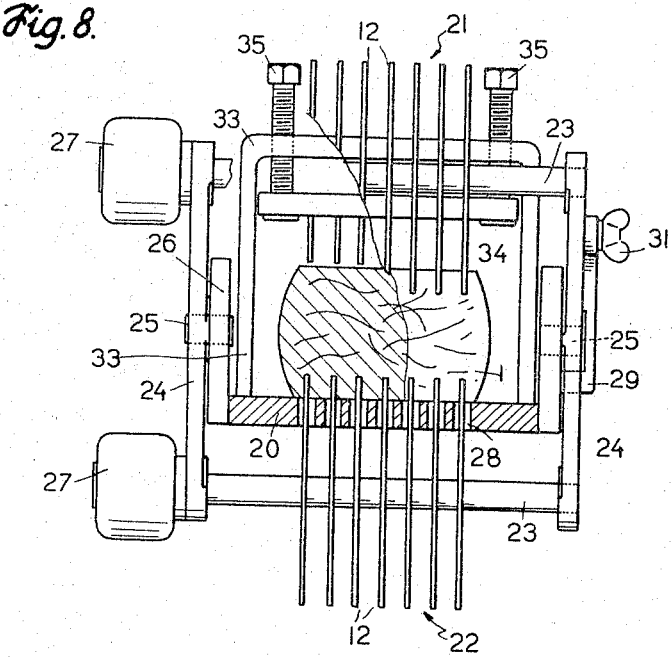
FIG. 8 is a transverse sectional view taken along the line 8—8 on FIG. 7.

Referring to the drawing in detail, and initially to FIGS. 1 and 4, FIGS. 2 and 5, and FIGS. 3 and 6, it will be seen that, in accordance with the present invention, the rip sawing of a log or timber 1 for producing a plurality of boards or planks therefrom, as in FIG. 3, is effected by passing the log or timber lengthwise of the grain through a sawing apparatus which makes progressively deeper saw cuts, with each of the successive saw cuts or kerfs removing a depth of material which is only a fraction of the depth or thickness of the log or timber. More specifically, as shown in FIGS. 1 and 4, the initial saw cuts formed in the log or timber 1 produce parallel kerfs 2 in the top and bottom surfaces of the log or timber each having a depth which is only a fraction of the total depth or vertical dimension of the log or timber, with relatively long, unitary chips 3 being formed during the sawing of the kerfs 2. During the next sawing of the log or timber 1, the previously formed kerfs are further deepened, as at 4, by a distance which is again only a fraction of the total depth of the log or timber 1, with relatively long chips 5 being again removed from the respective bottoms of the saw kerfs 4. Finally, as shown in FIGS. 3 and 6, the saw kerfs previously formed are deepened, as at 6, to complete the sawing through of the log or timber, with relatively long chips 7 being removed from the connecting portion of the log or timber between the saw kerfs 6 during the final sawing through of the log or timber.

As is evident from joint consideration of FIGS. 1 to 6, the length of each chip 3, 5, 7 is about ten times the width of the corresponding kerf 2, 4, 6. The greatest thickness of each chip is about equal to the width of the associated kerf. Since the chip cannot be wider than the kerf from which it was cut, it is apparent that the length of each chip is many times greater than any dimension of the chip at right angles to its length. The wood grain in each chip extends mainly in the direction of elongation of the chip.

In order to ensure that the relatively long chips 3, 5 and 7 will be removed intact from the log or timber 1 during the sawing of the successively deepened kerfs 2, 4 and 6, respectively, each of the saw kerfs is produced by a rotary saw blade 12 formed with a series of peripheral teeth 13 having the configuration illustrated in FIGS. 12 and 13. In accordance with the present invention, each tooth 13 of the saw blade 12 has a face 14 which is arcuately concave starting at its cutting edge 15 and a large rounded gullet whose walls define an enclosed circle of radius $r$ which is between $\frac{1}{5}$ and $\frac{1}{14}$ of the peripheral diameter $D$ of the rotary saw blade in the radial plane of FIG. 12. Further, the face angle $a$ of the tooth 13 with respect to a radial line extending from the center of the blade to the cutting edge 15 is at least 40°. Each blade 12 may further be provided with guiding teeth 16 and 17 interposed between the successive chip removing teeth 13 and having a substantial negative face angle $b$ of at least 20°. The guiding teeth 16 and 17 may be formed so that they only stabilize the blade during the operation of the latter, or such teeth may be designed as precutting teeth which simultaneously act also as guiding teeth for stabilizing the cutting action of the blade.

Referring to FIGS. 7 and 8 of the drawing, it will be seen that an apparatus for producing the successive saw cuts or kerfs of incrementally increased depths in accordance with the present invention, as described above with reference to FIGS. 1 to 6, inclusive, may include a saw table 20 along which the log or timber 1 is suitably conveyed first in one direction, and then in the opposite direction, during successive passes through the sawing apparatus. Further, the sawing apparatus includes upper and lower saw blade assemblies 21 and 22 each including a series of axially spaced apart rotary saw blades 12 of the type described above with reference to FIG. 12, which rotary saw blades are mounted on a horizontal axle 23. The axles 23 of the saw blade assemblies 21 and 22 are respectively journalled in the opposite end portions of support arms 24 which are turnable in vertical planes adjacent the sides of saw table 20 about pivots 25 carried by brackets 26 and extending through the centers of the support arms 24. Thus, the saw blades 12 of the upper and lower saw blade assemblies 21 and 22 may be rotated about parallel, horizontal axes by electric motors 27 (FIG. 8) which are suitably coupled to the axles or shafts 23 of the saw blade assemblies. Table 20 has slots 28 formed therein so that the blades 12 of the lower assembly 22 can extend upwardly through the related slots 28 to cut into the lower surface of the log or timber 1, while the blades of the upper saw blade assembly 21 simultaneously cut into the upper surface of the log or timber advanced along table 20.

It will be apparent that the vertical distance between horizontal tangents to the peripheries of the saw blades of the upper and lower assemblies 21 and 22 will be progressively reduced by tilting of the arms 24 about the pivots 25 from the vertical positions of the arms 24 illustrated in FIG. 7, thereby to permit adjustment of the depths of the kerfs simultaneously formed in the top and bottom of the log or timber by the saw blade assemblies.

In order to securely hold the upper and lower saw blade assemblies 21 and 22 in their adjusted positions during each pass of the log or timber 1 through the sawing apparatus, at least one of the brackets 26 may have an arcuate extension 29 formed with a slot 30 concentric with the pivots 25 and receiving a locking bolt 31 which is screwed into a suitably tapped hole in the adjacent arm 24 so that tightening of the bolt 31 is effective to secure the arm 24 either in its vertical position, as shown in FIG. 7, or in any tilted position.

When using the above described apparatus of FIGS. 7 and 8, the pivoted arms 24 are initially disposed vertically, as shown in the drawing, so that, during the first pass of the log or timber 1 through the sawing apparatus, the saw blades 12 form relatively shallow kerfs in the top and bottom surfaces of the log or timber, as at 2 on FIGS. 1 and 4, during the removal of the chips 3. Before the next pass of the log or timber through the sawing apparatus, the arms 24 are tilted from the vertical so that the saw blades 12 are effective to produce the further deepened saw kerfs 4 of FIGS. 2 and 5 during the subsequent passage of the log or timber through the sawing apparatus, at which time the chips 5 are removed from the bottom of the saw kerfs. Finally, the arms 24 are further tilted from the vertical so that the horizontal tangents to the bottoms of the top saw blades and to the tops of the bottom saw blades are substantially aligned at the center of the log or timber 1, whereby passage of the latter through the sawing apparatus results in the sawing through of the log or timber, as in FIGS. 3 and 6, with the chips 7 being removed during such final sawing through of the log or timber.

Joint consideration of FIGS. 1–6 and 7, which are drawn to approximately the same scale, shows that the cutting edge of each tooth enters the outer surface of the log 1 during the first pass of the log through the sawing apparatus from a point of contact in a direction which has a predominant longitudinal component, and is disengaged from the log at the surface thereof at a point of egress while still moving in a direction which is mainly longitudinal of the log.

During deepening of the kerf in the second and subsequent passes, the cutting edge 15 of each chip forming tooth enters the portion of the log which connects two coplanar kerfs at the bottom surface of the kerf in a direction which is parallel to the direction of log elongation. When being withdrawn from cutting contact with the log, the cutting edge 15 still moves in a mainly longitudinal direction, as is evident from the cut surfaces of the chips illustrated in FIGS. 5 and 6. The longitudinal component thus prevails in each portion of the path in which the cutting edge moves through the wood in cutting engagement with the same.

The dimensions of the gullets are such that the length of the arcuate concave face 14 is similar to the length of chips 3, 5, 7, and the volume of each chip is but a small fraction of the space within each gullet. Each thin and narrow chip is thus readily accommodated in the associated gullet when cut from the log 1 by passage of a cutting edge 15 through the wood of the latter. There is little tendency to break the chip, and most chips are discharged from the blade 12 intact, as cut from the log 1, into the surrounding atmosphere from which they are recovered in a manner not further illustrated.

In order to ensure that the successively deepened saw kerfs 2, 4 and 6 will coincide laterally with each other, the sawing apparatus of FIGS. 7 and 8 may further have a guiding assembly 32 that includes a frame 33 straddling the table 20, a laterally extending bar 34 suspended within the frame 33, as by screws 35 so as to be vertically adjustable, and a series of laterally spaced apart blades 36 depending from the bar 34 at positions corresponding to the lateral locations of the saw blades 12 so that, when the log or timber is passed successively through the sawing apparatus, bar 34 can be lowered to engage its blades 36 in the previously formed saw kerfs 2 or 4 for making certain the accurate lateral registration of the successive saw kerfs.

Figure 9:
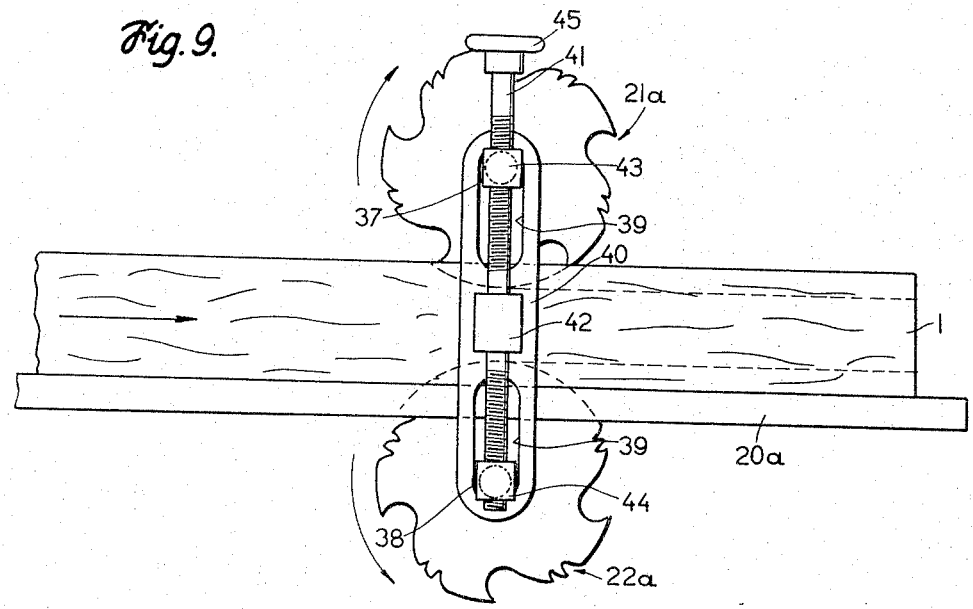
FIG. 9 is a diagrammatic side elevational view similar to that of FIG. 7, but illustrating a sawing apparatus in accordance with another embodiment of this invention.

Referring now to FIG. 9, it will be seen that, in another sawing apparatus embodying the present invention, the ends of the upper and lower saw blades assemblies 21a and 22a, respectively, are journalled in bearings 37 and 38 which are vertically movable in slots or other guides 39 formed in fixed vertical supports 40 extending upwardly at the opposite sides of the saw table 20a so that the saw blade assemblies 21a and 22a can be adjusted vertically toward and away from each other in varying the depths of the saw cuts during the successive passes of the log or timber 1 through the sawing apparatus. The vertical adjustments of the upper and lower saw blade assemblies 21a and 22a may be effected by an adjusting screw member 41 extending vertically alongside each support 40 and being rotatably journaled, intermediate its ends, in a bearing block 42 which is suitably secured to the support 40. The adjusting screw 41 has oppositely threaded portions above and below the bearing block 42, and such oppositely threaded portions of the adjusting screw are threadably engaged with nut members 43 and 44 which are suitably secured to the bearings 37 and 38, respectively, so that turning of the adjusting screw 41, for example, through a hand wheel 45 at one end thereof, is effective to either increase or decrease the vertical distance between the upper and lower saw blade assemblies.

It will be apparent that, with the arrangement illustrated in FIG. 9, the log or timber which is to be ripped is repeatedly passed through the sawing apparatus, with the saw blade assemblies being adjusted after each pass so as to incrementally increase the depth of the saw cuts or kerfs until the log or timber is completely sawn through, as in FIGS. 3 and 6.

Although the sawing apparatus described above with respect to FIG. 9, as well as the apparatus of FIGS. 7 and 8, employs a single set of upper and lower saw blade assemblies, so that the incrementally increased saw kerfs are cut in the log or timber 1 during successive passes through the sawing apparatus, it is to be noted that, in accordance with the present invention, a sawing apparatus may be provided, as in FIG. 10, which apparatus is operative to successively produce the saw kerfs of incrementally increasing depth during a single pass of the log or timber 1 through such sawing apparatus. More specifically, the apparatus illustrated in FIG. 10 includes three sets of upper and lower saw blade assemblies, as indicated generally at A, B and C, with each set of saw blade assemblies being adjustably mounted in the manner described above with respect to FIG. 9 so that the successively located saw blade assemblies at A, B and C can be adjusted to make successively increasing depths of cuts in the log or timber 1 during a single pass of the latter through the sawing apparatus.

Referring now to FIG. 11, it will be seen that, in accordance with another embodiment of the present invention, a sawing apparatus for practicing the method illustrated in FIGS. 1 to 6, inclusive, may have its upper and lower saw blade assemblies 21b and 22b, respectively, mounted for vertical adjustment toward and away from each other, so as to incrementally increase the depth of the kerfs during successive passes of the log or timber through the sawing apparatus, by means of arms 46 and 47 which are pivotally mounted, as at 48, on bracket 49 at the opposite sides of the saw table 20b and having the end portions of the axles 23b of the saw blade assemblies journalled in the free ends of the arms 46 and 47. Thus, the vertical distance between the upper and lower saw blade assemblies 21b and 22b is varied, for changing the depths of the kerfs, by angular displacement of the arms 46 and 47 in opposite directions about the related pivots 48. In order to hold the saw blade assemblies in their adjusted positions, each bracket 49 may be formed with an arcuate slot 50 concentric with the pivot 48 and slidably receiving bolts which extend through suitable holes in the arms 46 and 47 for engagement by locking nuts 51 and 52, respectively, so that tightening of the nuts 51 and 52 will secure arms 46 and 47 against angular displacement about the related pivots 48.

When the rip sawing of a log or timber into boards or planks is effected in the above described manner embodying the present invention, the resulting relatively long wood chips which are removed from the progressively deepened saw kerfs are suitable as a starting material for the production of chip boards, fiber boards and even cellulose, as distinguished from the fine sawdust resulting from conventional rip sawing and which is unusable for any commercial purpose. The quality of the chips that are obtained in accordance with the present invention is improved by increasing the diameter of the saw blades, by reducing the depth of each of the successive saw cuts, and by using wood having a relatively high moisture content, for example, wood that has been yarded while protected from direct exposure to rain prior to being sawed into boards or planks.

Although the above described apparatus is primarily concerned with obtaining wood chips of usable length from the saw kerfs which separate the adjacent boards or planks resulting from rip sawing of the log or timber 1, similar measures may be employed for obtaining relatively long usable wood chips from the arcuate side zones of the log or timber remaining after the rip sawing of the latter.

Although precise embodiments of the invention have been described in detail herein with reference to the accompanying drawing, it is to be noted that the invention is not limited to those precise embodiments, and that various changes and modifications may be effected therein, by one skilled in the art, without departing from the scope or spirit of the invention, except as defined in the appended claims.

What is claimed is:

1. An apparatus for rip sawing heavy elongated wooden members such as logs and timbers comprising, in combination:
    (a) a support;
    (b) two sets of saw blades mounted on said support for rotation about two respective spaced axes extending in a common direction,
        (1) each saw blade having a plurality of circumferentially spaced chip forming teeth, and a rounded gullet between each pair of circumferentially adjacent teeth,
        (2) each chip forming tooth having a cutting edge, a face angle of at least 40°, and a concave face starting from said cutting edge and leading into an associated gullet in said blade,
        (3) the walls of the gullet defining an enclosed circle in a plane radial relative to the axis of the blade, the circle having a radius between $\frac{1}{8}$ and $\frac{1}{14}$ of the peripheral diameter of said blade;
    (c) means for passing an elongated wooden member longitudinally between said sets of saw blades in a direction transverse of said common direction; and
    (d) adjusting means for varying the spacing of said axes perpendicular to said transverse direction, whereby said wooden member may be ripped during a plurality of passes between said saw blades by successive saw cuts of progressively increasing depth.

2. An apparatus as set forth in claim 1, wherein each of said blades further has a guiding tooth interposed between two circumferentially adjacent chip forming teeth, said guiding tooth having a negative face angle of at least 20°.

3. An apparatus as set forth in claim 1, wherein said support includes a stationary base, and a frame carrying said sets of saw blades, said frame being mounted on said base for pivoting movement about an axis extending in said common direction.

4. An apparatus as set forth in claim 3, wherein said adjusting means include an arm pivotally mounted on said support and carrying one of said sets.

5. An apparatus as set forth in claim 1, further comprising a plurality of guide knives respectively aligned with the saw blades of one of said sets in said transverse direction for engagement with previously formed kerfs in said wooden member during a pass between said blades.

6. An apparatus for rip sawing heavy elongated wooden members such as logs and timbers comprising, in combination:
(a) saw table means defining a horizontally extending path for a wooden member to be sawed;
(b) an upper saw blade and a lower saw blade mounted on said table means for rotation about respective axes in a common plane;
  (1) each saw blade having a plurality of peripheral chip forming teeth, and a gullet between circumferentially adjacent teeth;
  (2) each tooth having a cutting edge and a face angle of at least 40° with respect to a radial line to said cutting edge, and a concavely arcuate face contiguously adjacent said cutting edge and constituting a wall of said gullet; and
(c) fastening means for selectively securing said blades on said table means in a plurality of positions in which said axes are differently spaced in a direction perpendicular to said path.

7. An apparatus for rip sawing heavy elongated wooden members such as logs and timbers comprising, in combination:
(a) a support;
(b) a plurality of saw blades, said saw blades constituting two pairs of sets;
  (1) the blades of each set being mounted on said support for rotation about respective axes extending in a common direction, the axes of one pair being spaced from the other pair in a direction transverse of said common direction;
  (2) each saw blade having a plurality of circumferentially spaced chip forming teeth, and a rounded gullet between each pair of circumferentially adjacent teeth;
  (3) each chip forming tooth having a cutting edge, a face angle of at least 40°, and a concave face starting from said cutting edge and leading into an associated gullet in said blade;
  (4) the walls of the gullet defining an enclosed circle in a plane radial relative to the axis of the blade, the circle having a radius between ⅕ and ¼₄ of the peripheral diameter of said blade;

(c) means on said support defining a path of longitudinal movement for an elongated wooden member, said path successively passing between the sets of saw blades of one of said pairs and between the sets of saw blades of the other pair of said transverse direction;
  (1) the spacing of sets of said one pair in a direction perpendicular to said path being greater than the spacing of the sets of said other pair in said perpendicular direction.

8. An apparatus for rip sawing a wooden member such as a log and timber comprising, in combination:
(a) a support;
(b) a set of saw blades mounted on said support for rotation about a common axis in respective axially spaced planes perpendicular to said axis;
  (1) each saw blade having a plurality of circumferentially spaced chip forming teeth, and a rounded gullet between each pair of circumferentially adjacent teeth;
  (2) each chip forming tooth having a cutting edge, a face angle of at least 40°, and a concave face starting from said cutting edge and leading into an associated gullet;
  (3) the walls of the gullet defining an enclosed circle in the associated perpendicular plane, said circle having a radius between ⅕ and ¼₄ of the peripheral diameter of said blade;
(c) means on said support defining a path of movement of a wooden member substantially parallel to said planes for sawing engagement of said blade with said wooden member; and
(d) adjusting means for varying the spacing of said path from said axis in said planes.

References Cited

UNITED STATES PATENTS

| | | | |
|---|---|---|---|
| 349,356 | 9/1886 | Parish | 143—40 |
| 877,392 | 1/1908 | Zeitinger | 143—45 |
| 1,490,308 | 4/1924 | Bedford | 143—45 X |
| 2,664,926 | 1/1954 | Fuglie | 143—40 X |
| 2,717,012 | 9/1955 | Schneider | 143—40 X |

FOREIGN PATENTS 149,189  11/1952  Australia.

WILLIAM W. DYER, Jr., *Primary Examiner.*

W. D. BRAY, *Assistant Examiner.*